(12) United States Patent
Gauthier et al.

(10) Patent No.: US 8,857,146 B2
(45) Date of Patent: Oct. 14, 2014

(54) MULTI-STRAND CORD IN WHICH THE BASIC STRANDS ARE DUAL LAYER CORDS, RUBBERIZED IN SITU

(75) Inventors: Jacques Gauthier, Lempdes (FR); Henri Barguet, Martres-D'Artiere (FR); Sandra Boisseau, Chappes (FR); Thibaud Pottier, Clermont-Ferrand (FR)

(73) Assignees: Michelin Recherche et Techniques S.A., Grangers-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 359 days.

(21) Appl. No.: 13/382,141

(22) PCT Filed: Jul. 5, 2010

(86) PCT No.: PCT/EP2010/059525
§ 371 (c)(1),
(2), (4) Date: Mar. 19, 2012

(87) PCT Pub. No.: WO2011/000964
PCT Pub. Date: Jan. 6, 2011

(65) Prior Publication Data
US 2012/0159919 A1    Jun. 28, 2012

(30) Foreign Application Priority Data
Jul. 3, 2009 (FR) .................... 09 54595

(51) Int. Cl.
*D02G 3/48* (2006.01)
*D07B 1/06* (2006.01)
*D07B 7/14* (2006.01)
*D07B 5/12* (2006.01)

(52) U.S. Cl.
CPC ...... *D07B 1/0613* (2013.01); *D07B 2401/2025* (2013.01); *D07B 2201/2023* (2013.01);
(Continued)

(58) Field of Classification Search
CPC .... D07B 1/0606; D07B 1/062; D07B 1/0626; B60C 9/007; B60C 2015/0685
USPC .................... 57/211, 212, 223, 232, 237, 241
See application file for complete search history.

(56) References Cited

U.S. PATENT DOCUMENTS 5,139,874 A * 8/1992 Starinshak et al. ........... 428/375
5,279,695 A * 1/1994 Starinshak et al. ........... 156/296

(Continued)

FOREIGN PATENT DOCUMENTS

FR    2 925 922    7/2009
FR    2 925 923    7/2009

(Continued)

OTHER PUBLICATIONS

Wolf et al., "Alernative Konstruktionen Von Stahlzugtragern in Fordergurten", Kautsuk and Gummi-Kunstoffe, Huthigverlag, Heidelberg, Germany, vol. 46, No. 9, pp. 727-731, Sep. 1, 1993.

*Primary Examiner* — Shaun R Hurley
(74) *Attorney, Agent, or Firm* — Cozen O'Connor

(57) ABSTRACT

Metal cord of K×(L+M) construction. K elementary strands assembled in a helix, with pitch $P_K$, each having a cord with L wire inner layer of diameter $d_1$, and M wire outer layer of diameter $d_2$, in a helix with pitch $p_2$ around the inner layer; with (in mm): $0.10<d_1<0.50$; $0.10<d_2<0.50$; $3<p_2<10$; inner layer is sheathed with filling rubber; over a K times $P_K$ length of the elementary strand, filling rubber is in each of the capillaries delimited by the L wires of the inner layer and the M wires of the outer layer, and also, when L is equal to 3 or 4, in the central channel delimited by the L wires of the inner layer. The amount of filling rubber in said elementary strand is 5 to 40 mg per g of elementary strand.

31 Claims, 5 Drawing Sheets

(52) U.S. Cl.
CPC  *D07B 2205/3075* (2013.01); *D07B 2201/2039* (2013.01); *D07B 2201/2046* (2013.01); *D07B 2205/306* (2013.01); *D07B 2205/3021* (2013.01); *D07B 2201/1068* (2013.01); *D07B 1/0626* (2013.01); *D07B 2201/2061* (2013.01); *D07B 2201/1032* (2013.01); *D07B 2201/2062* (2013.01); *D07B 7/145* (2013.01); *D07B 2401/201* (2013.01); *D07B 2205/2075* (2013.01); *D07B 2401/2005* (2013.01); *D07B 2201/2081* (2013.01); *D07B 2205/3071* (2013.01); *D07B 1/062* (2013.01); *D07B 2201/2059* (2013.01); *D07B 2201/2011* (2013.01); *D07B 2207/4072* (2013.01); *D07B 2501/2046* (2013.01); *D07B 2205/3067* (2013.01); *D07B 2201/2025* (2013.01); *D07B 2201/2028* (2013.01); *D07B 2201/203* (2013.01); *D07B 5/12* (2013.01); *D07B 2205/3089* (2013.01); *D07B 2201/2032* (2013.01)
USPC .................................. 57/223; 57/237; 57/241

(56) References Cited

U.S. PATENT DOCUMENTS

| | | | | |
|---|---|---|---|---|
| 6,360,522 | B1 * | 3/2002 | Walton | 57/212 |
| 7,458,200 | B2 * | 12/2008 | Kish | 57/237 |
| 8,117,818 | B2 * | 2/2012 | Ikehara | 57/237 |
| 8,191,348 | B2 * | 6/2012 | Barguet et al. | 57/223 |
| 8,209,949 | B2 * | 7/2012 | Barguet et al. | 57/212 |
| 8,601,782 | B2 * | 12/2013 | Nakamura | 57/218 |
| 8,627,696 | B2 * | 1/2014 | Pottier et al. | 72/64 |
| 2002/0160213 | A1 * | 10/2002 | Imamiya et al. | 428/465 |
| 2003/0106300 | A1 * | 6/2003 | Bruyneel et al. | 57/212 |
| 2005/0121126 | A1 * | 6/2005 | Hirachi et al. | 152/451 |
| 2007/0130905 | A1 * | 6/2007 | Kish | 57/237 |
| 2008/0318077 | A1 * | 12/2008 | Barguet et al. | 428/592 |
| 2009/0294009 | A1 * | 12/2009 | Barguet et al. | 152/527 |
| 2010/0000645 | A1 * | 1/2010 | Ikehara | 152/451 |
| 2010/0170215 | A1 * | 7/2010 | Nishimura | 57/258 |
| 2011/0011486 | A1 * | 1/2011 | Pottier et al. | 140/149 |
| 2011/0017376 | A1 * | 1/2011 | Pottier et al. | 152/451 |
| 2011/0198008 | A1 * | 8/2011 | Pottier et al. | 152/451 |
| 2011/0315296 | A1 * | 12/2011 | Cogne et al. | 152/556 |
| 2012/0000590 | A1 * | 1/2012 | Cogne et al. | 152/564 |
| 2012/0055602 | A1 * | 3/2012 | Nishimura | 152/451 |
| 2012/0159919 | A1 * | 6/2012 | Gauthier et al. | 57/212 |
| 2012/0174557 | A1 * | 7/2012 | Boisseau et al. | 57/213 |
| 2012/0285602 | A1 * | 11/2012 | Domingo et al. | 152/548 |
| 2012/0298276 | A1 * | 11/2012 | Barguet et al. | 152/527 |
| 2012/0298280 | A1 * | 11/2012 | Domingo | 152/556 |
| 2012/0318428 | A1 * | 12/2012 | Domingo | 152/556 |
| 2013/0199690 | A1 * | 8/2013 | Barguet et al. | 152/527 |
| 2013/0292027 | A1 * | 11/2013 | Sallaz et al. | 152/552 |
| 2013/0340913 | A1 * | 12/2013 | Sallaz et al. | 152/552 |
| 2014/0008003 | A1 * | 1/2014 | Sallaz et al. | 152/552 |

FOREIGN PATENT DOCUMENTS

| | | |
|---|---|---|
| JP | 2006 218934 | 8/2006 |
| JP | 2009 024268 | 2/2009 |
| WO | WO 2009/011397 | 1/2009 |
| WO | WO 2009/080583 | 7/2009 |
| WO | WO 2010/012411 | 2/2010 |

* cited by examiner

MULTI-STRAND CORD IN WHICH THE BASIC STRANDS ARE DUAL LAYER CORDS, RUBBERIZED IN SITU

RELATED APPLICATIONS

This is a U.S. National Phase Application under 35 USC §371 of International Application PCT/EP2010/059525, filed on Jul. 5, 2010.

This application claims the priority of French application no. 09/54595 filed on Jul. 3, 2009, the content of which is hereby incorporated by reference.

FIELD OF THE INVENTION

The present invention relates to multistrand cords (also called multistrand ropes), which can especially be used for the reinforcement of pneumatic tires for heavy industrial vehicles, such as heavy goods or civil engineering vehicles.

The invention also relates to cords of the "rubberized in situ" type, that is to say coated on the inside, during their very manufacture, by rubber or a rubber composition in the uncrosslinked (green) state, before they are incorporated into rubber articles, such as tires, which they are intended to reinforce.

The invention also relates to tires and to the reinforcements for these tires, and to the crown reinforcements, also called "belts", of these tires, and more particularly to the reinforcement of the tire belts for heavy industrial vehicles.

BACKGROUND OF THE INVENTION

As is known, a radial tire comprises a tread, two inextensible beads, two sidewalls connecting the beads to the tread, and a belt placed circumferentially between the carcass reinforcement and the tread. This belt is made up of various rubber plies (or "layers") which may or may not be reinforced by reinforcing elements (called "reinforcers") such as cords or monofilaments, of the metal or textile type.

The belt generally consists of several superposed belt plies, sometimes called "working" plies or "crossed" plies, the generally metallic reinforcing cords of which are placed so as to be practically parallel to one another within a ply but crossed from one ply to another, that is to say they are inclined, whether symmetrically or not, to the median circumferential plane. These crossed plies are generally accompanied by various other auxiliary rubber plies or layers, which vary in width depending on the case and may or may not comprise metal reinforcers. Mention may in particular be made of what are called "protective" plies responsible for protecting the rest of the belt from external attack, from perforations, or else what are called "hoop" plies having metallic or non-metallic reinforcers oriented substantially in the circumferential direction, (so-called "zero-degree" plies), irrespective of whether they are radially outer or inner in relation to the crossed plies.

As is known, such a tire belt must meet various, often contradictory, requirements, in particular:
  it must be as rigid as possible at low deformation, as it contributes substantially to stiffening the tire crown;
  it must have as low a hysteresis as possible, in order, on the one hand, to minimize heating of the inner region of the crown during running and, on the other hand, to reduce the rolling resistance of the tire, this being synonymous with fuel economy; and;
  finally, it must have a high endurance, in particular with respect to the phenomenon of separation, cracking of the ends of the crossed plies in the shoulder region of the tire, known as "cleavage", which in particular requires metal cords that reinforce the belt plies to have a high compressive fatigue strength, when in a relatively corrosive atmosphere.

The third requirement is particularly important in the case of tires for industrial vehicles, such as heavy goods vehicles or civil engineering machinery, which are designed in particular to be able to be retreaded one or more times when their treads reach a critical stage of wear after prolonged running or usage.

Furthermore, as is known, tire belts for industrial vehicles comprise one or more so-called "protective" crown plies or layers located beneath the tread and surmounting the working crown ply or plies, responsible for protecting the rest of the belt from external attack, tearing or other perforations.

These protective plies or layers must be sufficiently flexible and deformable so as, on the one hand, to best match the shape of the obstacle on which the belt bears during running and, on the other hand, to prevent the penetration of foreign bodies radially into the belt. Fulfilment of such requirements demands, as is known, the use in these protective layers of reinforcements or cords having a high elasticity and a high fracture energy.

To reinforce the protective crown plies, the hoop plies and the working crown plies for the tires of heavy goods vehicles, it is generally practice nowadays to use stranded cords, especially multistrand cords having a single layer (i.e. with no central core of one or more other strands) of K×(L+M) construction, the K elementary strands of which are assembled, wound simultaneously in a helix as a single layer, with an assembly pitch $P_K$; each of the K two-layer elementary strands, of L+M construction, itself comprises a plurality of steel wires also wound together in a helix as two concentric layers (an inner layer of L wires and an outer layer of M wires).

Such stranded cords of K×(L+M) construction, especially of the high-elongation type, are well known and have been described in many patent documents, in particular for reinforcing the protective crown plies of tires for industrial vehicles such as heavy goods vehicles or civil engineering vehicles (see for example EP 1000074, U.S. Pat. No. 6,475, 636, U.S. Pat. No. 7,458,200, WO 2004/003287 or US 2005/ 0183808, WO 2004/033789 or U.S. Pat. No. 7,089,726, or else RD (Research Disclosure) No. 33877, June 1992, 488- 492).

As is well known by those skilled in the art, these multistrand cords must be impregnated as much as possible by the rubber in the tire belts that they reinforce, so that this rubber penetrates as much as possible into spaces between the wires constituting the strands. If this penetration is insufficient, empty channels then remain along the strands, and corrosive agents, for example water, capable of penetrating the tires, for example as a result of the tire belt being cut or otherwise attacked, travel along these channels through said belt. The presence of this moisture plays an important role, causing corrosion and accelerating the fatigue process (so-called "fatigue-corrosion" phenomena) compared to use in a dry atmosphere.

All these fatigue phenomena, generally grouped together under the generic term "fatigue-fretting corrosion", are the cause of progressive degeneration of the mechanical properties of the cords and strands and may, under the most severe running conditions, affect the lifetime of the latter.

Moreover, it is known that good penetration of the cord by rubber makes it possible, because of the small volume of air trapped in the cord, to reduce the cure time of the tires (shortened "in-press time").

However, the constituent elementary strands of these multistrand cords have, at least in certain cases, the drawback of not being able to be penetrated right to the core.

This is in particular the case for elementary strands of 3+M or 4+M construction, because of the presence of a channel or capillary at the centre of the three core wires, which remains empty after external impregnation with rubber and therefore propitious, through a kind of "wicking" effect, to the propagation of corrosive media such as water. This drawback of the strands of 3+N construction is well known; it has been explained for example in the patent applications WO 01/00922, WO 01/49926, WO 2005/071157 and WO 2006/013077.

To solve this problem of penetrability right to the core of cords of 3+M construction, patent application US 2002/160213 has certainly proposed producing strands of the type rubberized in situ. The process proposed here consists in sheathing, individually (i.e. in isolation, "wire to wire") with rubber in the uncured state, upstream of the point of assembly (or twisting point) of the three wires, just one or preferably each of the three wires in order to obtain a rubber-sheathed inner layer before the M wires of the outer layer are subsequently put in place by being corded around the inner layer thus sheathed.

The above application provides no information relating to the construction of the 3+M strands, in particular neither information about the assembly pitches nor information about the amounts of filling rubber to be used. Furthermore, the proposed process poses many problems.

Firstly, the sheathing of one single wire in three (as illustrated for example in FIGS. 11 and 12 of this patent application US 2002/160213) does not guarantee sufficient filling of the final strand with the rubber and therefore prevents satisfactory corrosion resistance being obtained. Secondly, the wire-to-wire sheathing of each of the three wires (as illustrated for example in FIGS. 2 and 5 of that document), although effectively filling the strand, leads to the use of an excessively large amount of rubber. The overspill of rubber at the periphery of the final strand then becomes unacceptable under industrial cabling and rubber-coating conditions.

Because of the very high adhesion of rubber in the green (i.e. uncrosslinked) state, the strand thus rubberized becomes unusable because of the undesirable adhesion to the manufacturing tools or between the strand turns during winding of the latter onto a take-up reel, without even mentioning the final impossibility of correctly calendering the cord. It will be recalled here that calendering consists in converting the cord, by incorporation between two layers of rubber in the green state, into a rubberized metal fabric serving as semi-finished product for any subsequent manufacture, for example to produce a tire.

Another problem posed by the insulated sheathing of each of the three wires is the large amount of space required by using three extrusion heads. Because of such a space requirement, the manufacture of cords having cylindrical layers (i.e. with different pitches $p_1$ and $p_2$ from one layer to another, or with identical pitches $p_1$ and $p_2$ but with different twisting directions from one layer to the other) must necessarily be carried out in two batch operations: (i) individual sheathing of the wires followed by cabling and winding of the inner layer in a first step; and (ii) cabling of the outer layer around the inner layer in a second step. Again because of the high adhesion of rubber in the green state, the winding and intermediate storage of the inner layer require the use of spacers and many separators during winding onto an intermediate reel, so as to avoid undesirable adhesion between the coiled layers or between the turns of a given layer.

All the above constraints are greatly prejudicial from the industrial standpoint and in conflict with the aim of producing high manufacturing rates.

SUMMARY OF THE INVENTION

By continuing their research, the Applicants have discovered a novel multistrand cord of K×(L+M) construction, the K elementary strands of which, thanks to a specific structure obtained according to one particular manufacturing process, make it possible to alleviate the aforementioned drawbacks.

Consequently, a first aspect of the invention is directed to a multistrand metal cord of K×(L+M) construction, which can especially be used for reinforcing tire belts for industrial vehicles, consisting of K elementary strands assembled in a helix, with a helix pitch PK, each elementary strand:

consisting of a cord having two layers (Ci, Ce) of L+M construction, rubberized in situ, comprising an inner layer (Ci) consisting of L wires of diameter $d_1$, L varying from 1 to 4, and an outer layer (Ce) of M wires, M being equal to or greater than 5, of diameter $d_2$, which are assembled in a helix with a pitch $p_2$ around the inner layer (Ci); and having the following characteristics ($d_1$, $d_2$ and $p_2$ being expressed in mm):

$0.10 < d_1 < 0.50$;

$0.10 < d_2 < 0.50$;

$3 < p_2 < 10$;

its inner layer (Ci) is sheathed with a rubber composition called a "filling rubber";

over any length of the elementary strand equal to K times $P_K$, the filling rubber is present in each of the capillaries delimited by the L wires of the inner layer (Ci) and the M wires of the outer layer (Ce), and also, when L is equal to 3 or 4, in the central channel delimited by the L wires of the inner layer (Ci); and the amount of filling rubber in said elementary strand is between 5 and 40 mg per g of elementary strand.

Such a multistrand cord can be used for reinforcing rubber articles or semi-finished products, for example plies, hoses, belts, conveyor belts and tires.

The multistrand cord of the invention is most particularly intended for use as reinforcing element for a belt of a tire intended for industrial vehicles, such as "heavy" vehicles, i.e. underground trains, buses, road transport vehicles (lorries, tractors, trailers), off-road vehicles, and agricultural or civil engineering machinery and other transport or handling vehicles.

The invention also relates to these rubber articles or semi-finished products themselves when they are reinforced with a multistrand cord according to the invention, particularly tires intended especially for industrial vehicles.

BRIEF DESCRIPTION OF THE DRAWINGS

The invention and its advantages will be readily understood in the light of the description and the embodiments that follow, together with FIGS. 1 to 5 which relate to these embodiments and which schematically show, respectively:

in cross section, a strand of 3+9 construction, of the type having cylindrical layers, which can be used in a multistrand cord according to the invention (FIG. 1);

Figure 1:
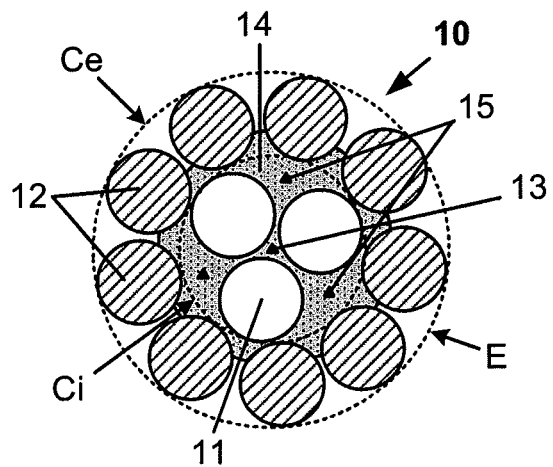
Figure 2:
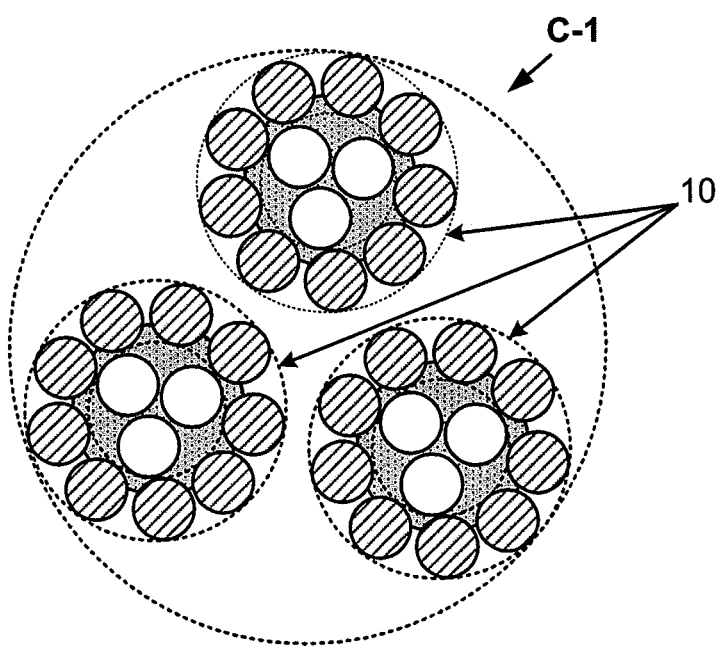
Figure 3:
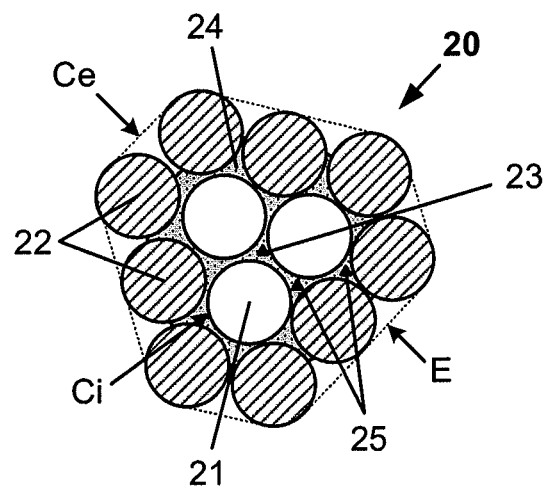
Figure 4:
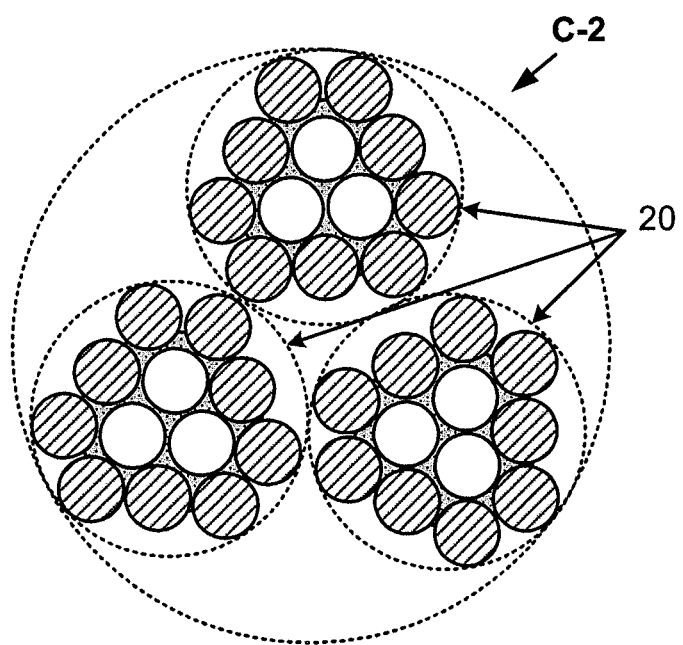
Figure 5:
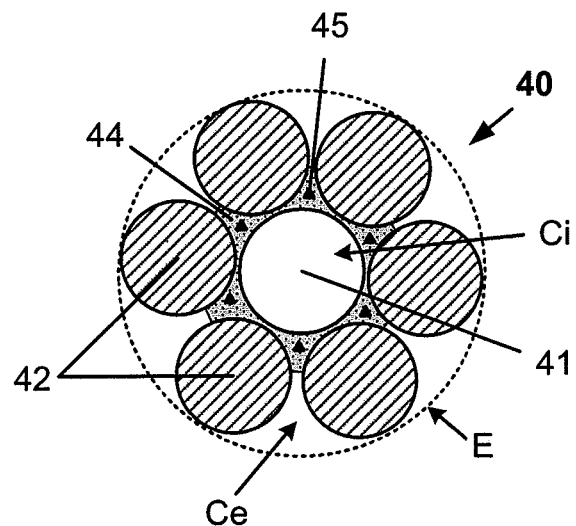
Figure 6:
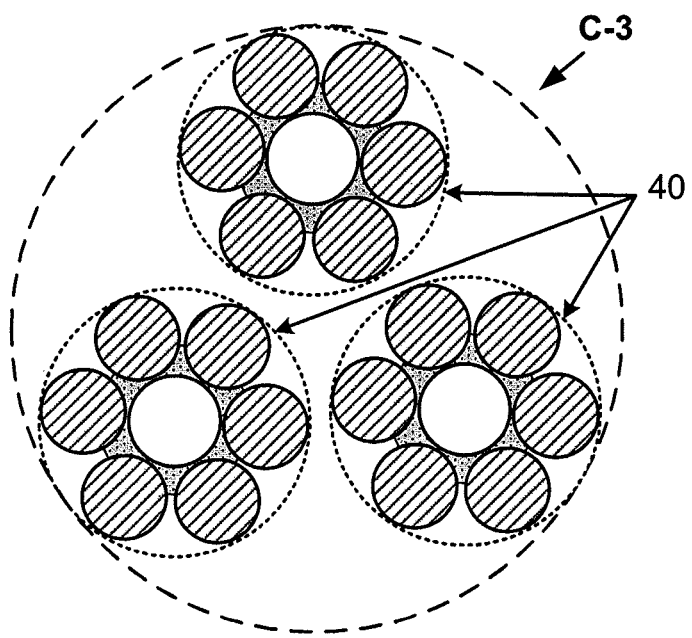
Figure 7:
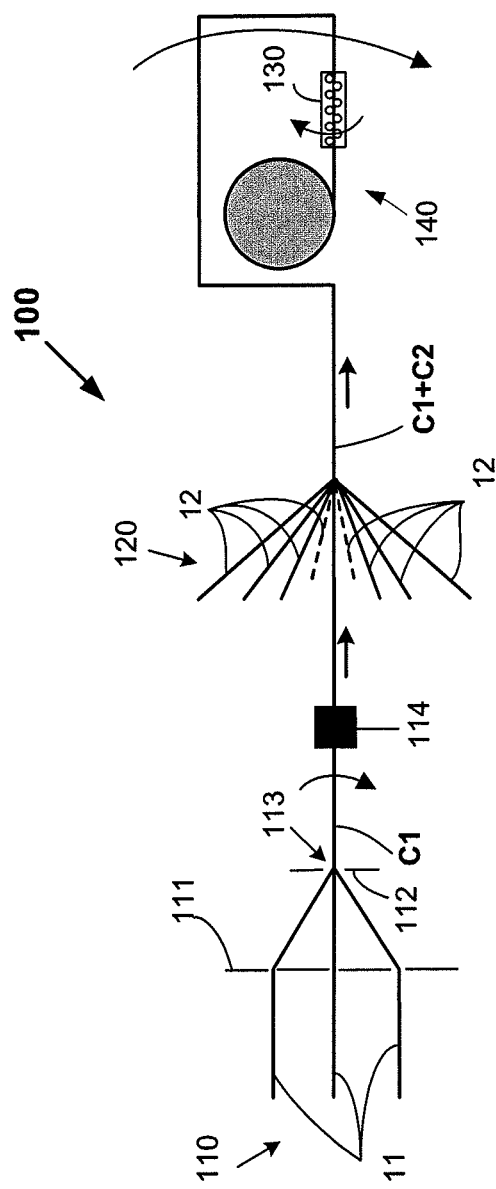
Figure 8:
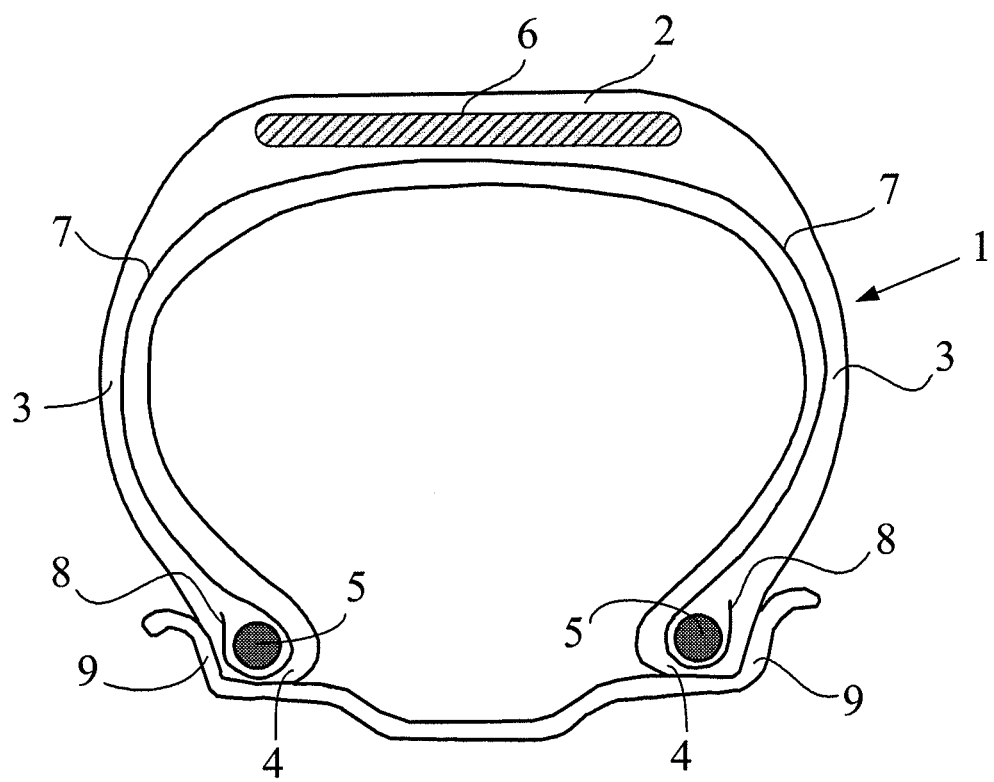

in cross section, an example of a multistrand cord according to the invention, of 3×(3+9) construction, incorporating the strand of FIG. 1 (FIG. 2);

in cross section, a strand of 3+9 construction, of compact type, which can be used in a multistrand cord according to the invention (FIG. 3);

in cross section, an example of a multistrand cord according to the invention, of 3×(3+9) construction, incorporating the strand of FIG. 3 (FIG. 4);

in cross section, another example of a strand of 1+6 construction, which can be used in a multistrand cord according to the invention (FIG. 5);

in cross section, another example of a multistrand cord according to the invention, of 3×(3+9) construction, incorporating the strand of FIG. 3 (FIG. 6);

an example of an installation for twisting and in situ rubberizing, which can be used for producing elementary strands intended for the manufacture of the multistrand cord of the invention (FIG. 7); and in radial cross section, a tire casing for an industrial vehicle with a radial carcass reinforcement, whether or not in accordance with the invention in this general representation (FIG. 8).

I. MEASUREMENTS AND TESTS

I-1. Tensile Test Measurements

As regards the metal wires and cords, the measurements of the breaking force denoted by $F_m$ (maximum load in N), the tensile strength denoted by $R_m$ (in MPa) and the elongation at break denoted by $A_t$ (total elongation in %) are carried out in tension according to the ISO 6892 (1984) standard.

As regards the diene rubber compositions, the modulus measurements are carried out in tension, unless otherwise indicated according to the ASTM D 412 (1998) standard (specimen "C"): the "true" secant modulus (i.e. referred to the actual cross section of the specimen) is measured in a second elongation (i.e. after an accommodation cycle) with a 10% elongation, the modulus being denoted by E10 and expressed in MPa (under the normal temperature and relative humidity conditions according to the ASTM D 1349 (1999) standard).

I-2. Air Permeability Test

This test enables the longitudinal air permeability of the tested elementary cords to be determined by measuring the volume of air crossing through a specimen under constant pressure over a given time. The principle of such a test, well known to those skilled in the art, is to demonstrate the effectiveness of the treatment of a cord in order to make it impermeable to air. The test has been described for example in the standard ASTM D2692-98.

The test is carried out here either on strands extracted from multistrand cords as produced, having undergone subsequent coating and curing, or on cords extracted from tires or from the rubber plies that these multistrand cords reinforce, and therefore already coated with cured rubber.

In the first case (multistrand cords as produced), the extracted cords must, before the test, be coated from the outside with a rubber coating compound. To do this, a series of 10 strands arranged so as to be in parallel (with an interstrand distance of 20 mm) is placed between two skims (two rectangles measuring 80×200 mm) of a cured rubber composition, each skim having a thickness of 3.5 mm. The whole assembly is then clamped in a mould, each of the strands being maintained under sufficient tension (for example 2 daN) to ensure that it remains straight when being placed in the mould, using clamping modules. The vulcanization (curing) process then takes place over 40 minutes at a temperature of 140° C. and under a pressure of 15 bar (rectangular piston measuring 80×200 mm), after which the assembly is demoulded and cut up into 10 specimens of metal strands thus coated, in the form of parallelepipeds measuring 7 mm×7 mm×$L_t$ for characterization.

A conventional tire rubber composition is used as rubber coating compound, said composition being based on natural (peptized) rubber and N330 carbon black (65 phr) and also containing the following standard additives: sulphur (7 phr); sulphonamide accelerator (1 phr); ZnO (8 phr); stearic acid (0.7 phr); antioxidant (1.5 phr); and cobalt naphthenate (1.5 phr). The modulus E10 of the rubber coating compound is about 10 MPa.

The test is carried out on a predetermined length $L_t$ (for example equal to K times $P_K$, 3 cm or even 2 cm), thus coated with its surrounding rubber composition (or rubber coating compound), in the following manner: air under a pressure of 1 bar is injected into the inlet of the strand and the volume of air leaving it is measured using a flowmeter (calibrated for example from 0 to 500 cm$^3$/min). During the measurement, the strand specimen is immobilized in a compressed seal (for example a rubber or dense foam seal) in such a way that only the amount of air passing through the strand from one end to the other, along its longitudinal axis, is measured. The sealing capability of the seal is checked beforehand using a solid rubber specimen, that is to say one without strands.

The measured average air flow rate (the average over the 10 specimens) is lower the higher the longitudinal impermeability of the strand. Since the measurement is accurate to ±0.2 cm$^3$/min, measured values of 0.2 cm$^3$/min or less are considered to be zero—they correspond to a strand that can be termed airtight (completely airtight) along its axis (i.e. in its longitudinal direction).

I-3. Amount of Filling Rubber

The amount of filling rubber is measured by difference between the weight of the initial strand (therefore in situ rubberized) and the weight of the strand (and therefore that of its wires) from which the filling rubber has been removed by an appropriate electrolytic treatment.

A strand specimen (1 m in length), wound on itself to reduce its space requirement, constitutes the cathode of an electrolyzer (connected to the negative terminal of a generator), whereas the anode (connected to the positive terminal) consists of a platinum wire. The electrolyte consists of an aqueous solution (demineralized water) containing 1 mol per liter of sodium carbonate.

Voltage is applied to the specimen, completely immersed in the electrolyte, for 15 min under a current of 300 mA. Next, the strand is removed from the bath and rinsed copiously with water. This treatment allows the rubber to be easily detached from the strand (if this is not so, the electrolysis is continued for a few minutes). The rubber is carefully removed, for example by simply wiping using an absorbent cloth, while untwisting the wires of the strand one by one. The wires are again rinsed with water and then immersed in a beaker containing a demineralized water (50%)/ethanol (50%) mixture. The beaker is immersed in an ultrasonic bath for 10 minutes. The wires thus stripped of any trace of rubber are removed from the beaker, dried in a stream of nitrogen or air, and finally weighed.

Deduced therefrom, by calculation, is the amount of filling rubber in the strand, expressed in mg (milligrams) of filling rubber per g (gram) of initial strand, and averaged over 10 measurements (i.e. along 10 meters of strand in total).

II. DETAILED DESCRIPTION

In the present description, unless expressly indicated otherwise, all the percentages (%) indicated are percentages by weight.

Moreover, any interval of values denoted by the expression "between a and b" represents the range of values going from more than a to less than b (i.e. the limits a and b are excluded) whereas any interval of values denoted by the expression "from a to b" means the range of values going from a up to b (i.e. the strict limits a and b are included).

II-1. Multistrand Cord of the Invention

The multistrand metal cord of the invention therefore has a K×(L+M) construction, that is to say it consists of K assembled elementary strands, wound together in a helix (as a single layer) with a helix pitch $P_K$.

Each of the K elementary strands itself consists of a cord having two layers (Ci, Ce) of L+M construction, rubberized in situ, comprising an inner layer (Ci) consisting of L wires of diameter $d_1$, L varying from 1 to 4, and an outer layer (Ce) of M wires, M being equal to or greater than 5, of diameter $d_2$, which are wound together in a helix with a pitch $p_2$ around the inner layer (Ci).

Each of these K elementary strands furthermore has the following characteristics ($d_1$, $d_2$ and $p_2$ being expressed in mm):

0.10<$d_1$<0.50;
0.10<$d_2$<0.50;
3<$p_2$10;
its inner layer (Ci) is sheathed with a rubber composition called a "filling rubber";
over any length of the elementary strand equal to K times $P_K$, the filling rubber is present in each of the capillaries bounded by the L wires of the inner layer (Ci) and the M wires of the outer layer (Ce), and also, when L is equal to 3 or 4, in the central channel bounded by the L wires of the inner layer (Ci); and
the amount of filling rubber in said elementary strand is between 5 and 40 mg per g of elementary strand.

Each elementary strand may thus be termed an in situ rubberized cord, that is to say rubberized on the inside, during its very manufacture (therefore in the as-manufactured state), with the filling rubber. In other words, each of the capillaries or interstices (these two terms are interchangeable, denoting the voids or free spaces where there is no filling rubber) that are located between and delimited by the L wires of the inner layer (Ci) and the M wires of the outer layer (Ce) is at least partly filled, whether continuously or not, along the axis of strand, with the filling rubber. Furthermore, the central channel or capillary formed by the 3 or 4 wires of the inner layer Ci, when L is equal to 3 or 4, also penetrated by some filling rubber.

According to a preferred embodiment, over any elementary strand portion equal to K times $P_K$ (more preferably equal to 3 cm, even more preferably equal to 2 cm), the central channel (when L is equal to 3 or 4) and each capillary or interstice, as described above, comprise at least one rubber plug. In other words, and preferably, there is at least one rubber plug every K times $P_K$ (more preferably every 3 cm, more preferably still every 2 cm) of elementary strand, which obstructs the central channel and each capillary or interstice of the outer strand in such a way that, in the air permeability test (according to section I-2), each outer strand of the multistrand core of the invention has an average air flow rate of less than 2 $cm^3$/min, more preferably less than or at most equal to 0.2 $cm^3$/min.

Each elementary strand has, as essential other feature, the fact that its amount of filling rubber is between 5 and 40 mg of rubber compound per g of strand.

Below the minimum indicated, it is not possible to guarantee that, over any length of elementary strand equal to K times $P_K$ (more preferably equal to 3 cm, even more preferably equal to 2 cm), the filling rubber is in fact present, at least in part, in each of the interstices or capillaries of the elementary strand, whereas, above the indicated maximum, the various problems described previously due to the overspill of filling rubber at the periphery of the strand are encountered. For all these reasons, it is preferable for the amount of filling rubber to be between 5 and 35 mg, more preferably still in the range from 10 to 30 mg per g of strand.

Such an amount of filling rubber, this being controlled within the abovementioned limits, is made possible only by virtue of the use of a specific twisting-rubberizing process adapted to the geometry of each elementary strand of L+M construction, which process will be explained in detail subsequently.

The implementation of this specific process, while enabling a strand to be obtained in which the amount of filling rubber is controlled, guarantees the presence of internal partitions (continuous or discontinuous along the axis of the strand) or rubber plugs in each elementary strand, especially in its central channel when L is equal to 3 or 4, in sufficient number. Thus, each elementary strand becomes impermeable to the propagation, along the strand, of any corrosive fluid, such as water or oxygen of air, thus eliminating the wicking effect described in the introduction of the present document.

According to one particularly preferred embodiment of the invention, the specific feature is verified: over any length of elementary strand equal to K times $P_K$ (more preferably equal to 3 cm, even more preferably equal to 2 cm), each elementary strand is airtight or almost airtight in the longitudinal direction.

In the air permeability test described in section I-2, an "airtight" L+M elementary strand is characterized by an average air flow rate of less than or at most equal to 0.2 $cm^3$/min, whereas an "almost airtight" L+M elementary strand is characterized by an average air flow rate of less than 2 $cm^3$/min, preferably less than 1 $cm^3$/min.

For an optimized compromise between strength, feasibility, rigidity and endurance in compression of the strand, it is preferred for the diameters of the wires of the layers Ci and Ce, which may or may not be the same from one layer to the other, to be between 0.15 and 0.35 mm.

The wires of the layers Ci and Ce may have the same diameter or a different diameter going from one layer to the other. It is possible to use wires of the same diameter from one layer to the other (i.e. $d_1=d_2$), thereby simplifying in particular their manufacture and reducing their cost.

According to a preferred embodiment, in each elementary strand, $p_2$ is in the range from 12 to 25 mm.

According to another preferred embodiment, $P_K$ is between 3 and 15 mm, more preferably in the range from 4 to 12 mm.

It will be recalled here that, as is known, the pitch "p" represents the length, measured parallel to the axis of the elementary strand or of the multistrand cord, at the end of which a wire or an elementary strand, respectively, having this pitch, completes one revolution about said axis.

According to a preferred embodiment, in each elementary strand, L is equal to 1, i.e. a single wire constitutes the inner layer (Ci) of each elementary strand.

According to another possible embodiment, in each elementary strand, L is different from 1 and, in such a case, the L wires of diameter $d_1$ are helically wound with a pitch $p_1$ preferably satisfying the relationship:

$$0.5 \leq p_1/p_2 \leq 1.$$

More preferably, in such a case, in each elementary strand, $p_1$ is between 3 and 10 mm. According to another, more preferable, embodiment, in each elementary strand, $p_1$ is equal to $P_2$.

According to another preferred embodiment, each elementary strand satisfies the following relationship:

$$0.7 \leq d_1/d_2 \leq 1.3,$$

even more preferably the following relationship:

$$0.8 \leq d_1/d_2 \leq 1.2.$$

According to another preferred embodiment of the invention, when L is different from 1, in each outer strand, the M wires of the outer layer (Ce) are helically wound either with a different pitch, or in a different twist direction, or with both a different pitch and a different twist direction, compared to the L wires of the inner layer (Ci).

It is especially the case for strands having cylindrical layers, as described for example in FIG. 1, in which the two layers Ci and Ce are wound in the same twist direction (S/S or Z/Z) but with a different pitch (i.e. $p_1 \neq p_2$). In such cylindrically layered strands, the compactness is such that the cross section of each elementary strand has a cylindrical contour and not a polygonal one.

However, according to another possible embodiment of the invention, in each elementary strand, the M wires of the outer layer (Ce) may be helically wound with the same pitch and in the same twist direction as the L wires of the inner layer (Ci), when L is different from 1, so as to obtain an elementary strand of the compact type (i.e. with a polygonal contour) as shown for example in FIG. 3.

The outer layer Ce of each of the K elementary strands is preferably a saturated layer, that is to say, by definition, there is not sufficient space in this layer to add thereto at least one $(M_{max}+1)$th wire of diameter $d_2$, $M_{max}$ representing the maximum number of wires that can be wound as one layer around the inner layer Ci. This construction has the advantage of limiting the risk of the filling rubber overspilling at its periphery and of providing, for a given elementary strand diameter, a higher strength.

Thus, the number M of wires may vary very widely depending on the particular embodiment of the invention, for example from 5 to 14 wires, it being understood that L may vary from 1 to 4 and that the maximum number $M_{max}$ of wires will be increased if their diameter $d_2$ is reduced in comparison with the diameter $d_1$ of the L core wires, so as preferably to maintain the outer layer in a saturated state.

Thus, according to one possible preferred embodiment, in each of the K elementary strands, L is equal to 1 and M is more preferably equal to 5, 6 or 7. In other words, each elementary strand is chosen from the group of cords having 1+5, 1+6 and 1+7 constructions. In this case, M is more preferably equal to 6.

According to another preferred embodiment of the invention, in each of the K elementary strands, L is equal to 2 and M is more preferably equal to 7, 8 or 9. In other words, each elementary strand is chosen from the group of cords of 2+7, 2+8 and 2+9 constructions. In this case, M is more preferably equal to 8.

According to another preferred embodiment of the invention, in each of the K elementary strands, L is equal to 3 and M is more preferably equal to 8, 9 or 10. In other words, each elementary strand is chosen from the group of cords of 3+8, 3+9 and 3+10 constructions. In this case, M is more preferably equal to 9.

According to another preferred embodiment of the invention, in each of the K elementary strands, L is equal to 4 and M is more preferably equal to 8, 9, 10 or 11. In other words, each elementary strand is chosen from the group of cords of 4+8, 4+9, 4+10 and 4+11 constructions. In this case, M is more preferably equal to 9 or 10.

Among all the above preferred elementary strands, the wires of the two layers (Ci, Ce) may have the same diameter (i.e. $d_1 = d_2$) or different diameters (i.e. $d_1 \neq d_2$) from one layer (Ci) to the other (Ce).

According to another particularly preferred embodiment, the K constituent elementary strands of the multistrand cord of the invention are wound in a helix in the same twist direction as the M wires of the outer layer (Ce) of each elementary strand, so as to increase the elasticity of the cord of the invention.

As already previously mentioned, the outer strands of the multistrand cord of the invention, like all multilayer cords, may be of two types, namely of the compact type or of the cylindrically layered type.

Preferably, when L is different from 1, all the wires of the layers Ci and Ce are wound in the same twist direction, i.e. either in the S direction (S/S arrangement) or in the Z direction (Z/Z arrangement). Winding the layers Ci and Ce in the same direction advantageously makes it possible to minimize the rubbing between these two layers and therefore the wear of the wires that constitute them. Even more preferably, the two layers Ci and Ce are wound in the same direction (S/S or Z/Z) and with a different pitch (preferably $p_1 < p_2$) in order to obtain an elementary strand of the cylindrically layered type, as shown for example in FIG. 1.

FIG. 1 shows schematically, in cross section perpendicular to the axis of the strand (assumed to be straight and at rest), an example of a preferred strand that can be used in the multistrand cord of the invention, having a 3+9 construction.

This strand (10) is of the cylindrically layered type, i.e. the wires (11, 12) of its inner and outer layers (Ci, Ce) are either wound with the same pitch ($p_1 = p_2$) but in a different direction (S/Z or Z/S), or wound with a different pitch ($p_1 \neq p_2$) whatever the twist direction (S/S or Z/Z or S/Z or Z/S). As is known, this type of construction has the consequence that the wires are arranged as two adjacent layers (Ci and Ce) that are concentric and tubular, giving a strand (and its two layers) an external outline E (shown dotted) which is cylindrical and not polygonal.

This FIG. 1 shows that the filling rubber (14), while very slightly splaying the wires, at least partly fills (here, in this example, completely fills) the central channel (13) delimited by the three wires (11) of the inner layer (Ci) and also each capillary or interstice (15) (as an example, some of these are shown symbolically by a triangle) that is located between, on the one hand, the 3 wires (11) of the inner layer (Ci) and the M wires (12) of the outer layer (Ce), these wires being taken at least 3 by 3.

According to a preferred embodiment, in each elementary strand of L+M construction, the filling rubber extends continuously around the inner layer (Ci) that it covers.

The number K of constituent elementary strands of the multistrand cord of the invention is preferably equal to 3, 4 or 5. More preferably, K is equal to 3.

According to one particular and preferred embodiment, K is equal to 3 and L is equal to 1, said cord of the invention therefore having a particular 3×(1+M) construction, M being especially equal to 5, 6 or 7.

According to another particular and preferred embodiment, K is equal to 3 and L is equal to 2, said cord of the invention therefore having a particular 3×(2+M) construction, M being especially equal to 7, 8 or 9.

According to another particular and preferred embodiment, K is equal to 3 and L is equal to 3, said cord of the invention therefore having a particular 3×(3+M) construction, M being especially equal to 8, 9 or 10.

According to another particular and preferred embodiment, K is equal to 3 and L is equal to 4, said cord of the invention therefore having a particular 3×(4+M) construction, M being especially equal to 8, 9, 10 or 11.

FIG. 2 shows schematically, in cross section perpendicular to the axis of the cord (again supposed to be straight and at rest), a preferred example of such a multistrand cord (denoted by C-1) according to the invention, having a 3×(3+9) construction. In this example, each of the 3 elementary strands has the same (3+9) construction and corresponds to the elementary strand (10) described above in FIG. 1. Its 3 constituent strands (10) could be in contact with one another; preferably they are not in contact with one another, thereby giving the multistrand cord of the invention a higher structural elongation $A_s$.

This multistrand cord of the invention, by virtue of its individual strands being rubberized in situ, is, as may be seen, highly penetrated internally by the filling rubber (14), thereby giving it improved fatigue-corrosion resistance.

FIG. 3 shows schematically, in cross section perpendicular to the axis of the strand (assumed to be straight and at rest), an example of another preferred strand that can be used in the multistrand cord of the invention, also having a (3+9) construction.

This strand (20) is of the cylindrically layered type, that is to say the wires (21, 22) of its inner and outer layers (Ci, Ce) are either wound with the same pitch ($p_1=p_2$) but in opposite directions (S/Z or Z/S) or wound with a different pitch ($p_1 \neq p_2$) whatever the twist directions (S/S or Z/Z or S/Z or Z/S). As is known, this type of construction has the consequence that the wires are arranged as two concentric and adjacent tubular layers (Ci and Ce) giving the strand (and its two layers) an external outline E (shown dotted) which is polygonal and not cylindrical.

FIG. 3 shows that the filling rubber (24), while very slightly splaying the wires, at least partly fills (here, in this example, completely fills) the central channel (23) delimited by the three wires (21) of the inner layer (Ci) and each of the capillaries or interstices (25) (as an example, some of them have been shown symbolically by a triangle) that are located, on the one hand, between the 3 wires (21) of the inner layer (Ci) and the 9 wires (22) of the outer layer (Ce), these wires being taken 3 by 3. In total 12 capillaries (25) are thus present in this example of elementary 3+9 strand, to which capillaries the central channel is added.

FIG. 4 shows schematically, in cross section perpendicular to the axis of the cord (again assumed to be straight and at rest), another example of a multistrand cord (denoted by C-2) according to the invention, having a 3×(3+9) construction. In this example, each of the 3 elementary strands has the same (3+9) construction and corresponds to the elementary strand (20) described previously with reference to FIG. 3. Its 3 constituent strands (20) in this example are in contact with one another. According to another preferred embodiment, they need not be in contact with one another, thereby giving the multistrand cord a higher structural elongation $A_s$. This multistrand C-2 cord, by virtue of the in situ rubberizing of its individual strands, shows, as may be seen, great internal penetration by the filling rubber (24), thereby giving it an improved fatigue-corrosion resistance.

FIG. 5 shows schematically another example of a preferred strand (40) that can be used in the multistrand cord of the invention, having a 1+6 construction. In this case, $d_1$ is slightly greater than $d_2$. It may be seen that the filling rubber (44) at least partly fills each interstice or cavity formed by the central wire (41) and the six outer wires (42) that are immediately adjacent thereto. In total, 6 interstices or capillaries (45) (shown by a triangle) are thus present in this example of a 1+6 strand.

FIG. 6 shows schematically another preferred example of a multistrand cord according to the invention (denoted by C-3), having a 3×(1+6) construction. In this example, each of the 3 elementary strands has the same 1+6 construction corresponding to the elementary strand (40) of FIG. 5, described above. Its 3 constituent strands (40) could be in contact with one another; preferably they are not in contact with one another, thereby giving the multistrand cord of the invention a higher structural elongation $A_s$. This C-3 multistrand cord, by virtue of its individual strands being rubberized in situ, is highly penetrated internally by the filling rubber (44).

The multistrand cords of the invention are preferably of the "elastic" type (also often called "HE" (high elongation) cords), that is to say they satisfy by definition, in the present application, at least the following two characteristics:

$A_s > 1.0\%$; $A_t > 3.5\%$.

More preferably, $A_t$ is greater than 4%.

It will be recalled that, as is well known to those skilled in the art, the total elongation at break ($A_t$) of an elastic metal cord is the sum of three separate elongations ($A_t = A_s + A_e + A_p$), namely:

a structural elongation $A_s$, resulting from the construction, aeration even of the multistrand cable and/or of its elementary strands, and also from their intrinsic elasticity, as the case may be, from a preformation imposed on one or more of these constituent wires and/or strands;

an elastic elongation $A_e$, resulting from the elasticity even of the metal of the metal wires, taken individually (Hooke's law);

a plastic elongation $A_p$, resulting from the plasticity (irreversible deformation above the yield point) of the metal of these metal wires taken individually.

The processes for manufacturing HE cords are well known to those skilled in the art, these being described for example in the aforementioned Patent Application WO 2004/003287.

The present invention relates of course to the multistrand cords described above both in the uncured state (their filling rubber then not being vulcanized) and in the cured state (their filling rubber then being vulcanized). However, it is preferred to use the multistrand cord of the invention with a filling rubber in the uncured state until it is subsequently incorporated into the semi-finished product or the finished product such as a tire for which it is intended, so as to promote bonding during the final vulcanization between the filling rubber and the surrounding rubber matrix (for example the calendering rubber).

The expression "metal cord or strand" is understood by definition in the present application to mean a cord or strand formed of wires consisting predominantly (i.e. more than 50% by number of these wires) or entirely (100% of the wires) of a metallic material. The wires are preferably made of steel, more preferably carbon steel. However, it is of course possible to use other steels, for example stainless steel, or other alloys.

When a carbon steel is used, its carbon content (% by weight of steel) is preferably between 0.4% and 1.2%, especially between 0.5% and 1.1%. These contents represent a good compromise between the mechanical properties required of the tire and the feasibility of the wires. It should be noted that a carbon content between 0.5% and 0.6% makes such steels finally less expensive as they are easier to draw.

Another advantageous embodiment of the invention may also consist, depending on the intended applications, in the use of steels having a low carbon content, for example between 0.2% and 0.5%, in particular because of a lower cost and greater wire drawability.

The metal or steel used, whether in particular a carbon steel or a stainless steel, may itself be coated with a metal layer that improves, for example, the processing properties of the metal cord and/or of its constituent components, or the usage properties of the cord and/or of the tire themselves, such as the adhesion, corrosion resistance or ageing resistance properties. According to a preferred embodiment, the steel used is coated with a layer of brass (Zn—Cu alloy) or of zinc. It will be recalled that, during the wire manufacturing process, the brass or zinc coating makes wire drawing easier and improves the bonding of the wire to the rubber. However, the wires could be coated with a thin metal layer other than a brass or zinc layer, for example having the function of improving the corrosion resistance of these wires and/or their adhesion to rubber, for example a thin layer of Co, Ni, Al, or an alloy of two or more of the compounds Cu, Zn, Al, Ni, Co, Sn.

The strands used in the multistrand cord of the invention are preferably made of carbon steel and have a tensile strength ($R_m$) of preferably greater than 2500 MPa, more preferably greater than 3000 MPa. The total elongation at break (denoted by $A_t$) of each constituent strand of the cord of the invention, which is the sum of its structural elastic and plastic elongations, is preferably greater than 2.0%, more preferably at least equal to 2.5%.

The elastomer (or indistinguishingly "rubber", the two terms being considered as synonyms) of the filling rubber is preferably a diene elastomer, more preferably chosen from the group formed by: polybutadienes (BR); natural rubber (NR); synthetic polyisoprenes (IR); various butadiene copolymers; various isoprene copolymers; and blends of these elastomers. Such copolymers are more preferably chosen from the group formed by: butadiene-stirene (SBR) copolymers, whether these are prepared by emulsion polymerization (ESBR) or by solution polymerization (SSBR); isoprene-butadiene (BIR) copolymers; isoprene-stirene (SIR) copolymers; and isoprene-butadiene-stirene (SBIR) copolymers.

A preferred embodiment consists in using an isoprene elastomer, that is to say an isoprene homopolymer or copolymer, in other words a diene elastomer chosen from the group formed by: natural rubber (NR); synthetic polyisoprenes (IR); various isoprene copolymers; and blends of these elastomers. The isoprene elastomer is preferably natural rubber or a synthetic polyisoprene of the cis-1,4 type. Among these synthetic polyisoprenes, it is preferred to use polyisoprenes having a (% molar) content of cis-1,4 bonds greater than 90%, more preferably still greater than 98%. According to other preferred embodiments, the diene elastomer may consist, in total or in part, of another diene elastomer such as, for example, an SBR elastomer optionally blended with another elastomer, for example of the BR type.

The filling rubber may contain one or more, especially diene, elastomers, this or these possibly being used in combination with any synthetic elastomer other than a diene elastomer, or even with polymers other than elastomers.

The filling rubber is preferably crosslinkable, that is to say it comprises by definition a suitable crosslinking system enabling the composition to be crosslinked while it is being cured (i.e. while hardening and not melting). Thus, in such a case, this rubber composition may be termed "unmeltable" because it cannot be melted by heating to any temperature whatsoever. Preferably, in the case of a diene rubber composition, this crosslinking system of the rubber sheath is a vulcanization system, i.e. based on sulphur (or a sulphur donor) and at least one vulcanization accelerator. Various known vulcanization activators may be added to this base vulcanization system. The sulphur is used preferably in an amount of between 0.5 and 10 phr, more preferably between 1 and 8 phr, and the vulcanization accelerator, for example a sulphenamide, is used preferably in an amount of between 0.5 and 10 phr, more preferably between 0.5 and 5.0 phr.

However, the invention also applies to cases in which the filling rubber contains no sulphur and even contains no other crosslinking system, given that, to crosslink it, the crosslinking or vulcanization system present in the rubber matrix that the cord of the invention is intended to reinforce, and capable of migrating, by contact with said surrounding matrix, into the filling rubber, could suffice.

The filling rubber may also include, apart from said crosslinking system, all or some of the additives normally used in rubber matrices intended for manufacturing tires, such as, for example: reinforcing fillers, such as carbon black or inorganic fillers, such as silica; coupling agents; anti-ageing agents; antioxidants; plasticizers or oil extenders, whether the latter be of aromatic or non-aromatic nature, especially oils which are very slightly aromatic or are non-aromatic, for example of the naphthenic or paraffinic type, of high or preferably low viscosity, MES or TDAE oils; plasticizing resins having a high $T_g$ greater than 30° C.; processing aids (which make it easier to process the compositions in the uncured state); tackifying resins; antireversion agents; methylene acceptors and donors, such as for example HMT (hexamethylenetetraamine) or H3M (hexamethoxymethylmelamine); reinforcing resins (such as resorcinol or bismaleimide); and known adhesion promoter systems of the metal salt type, for example, in particular cobalt, nickel or lanthanide salts, as described in particular in patent application WO 2005/113666.

The amount of reinforcing filler, for example carbon black or a reinforcing inorganic filler such as silica, is preferably greater than 50 phr, for example between 60 and 140 phr. It is more preferably greater than 70 phr, for example between 70 and 120 phr. Suitable carbon blacks are all carbon blacks, especially blacks of the HAF, ISAF, SAF type, conventionally used in tires (these being called tire-grade blacks). Among the latter, mention may more particularly be made of carbon blacks of ASTM grade 300, 600 or 700 (for example, N326, N330, N347, N375, N683 and N772). Suitable inorganic reinforcing fillers are especially mineral fillers of the silica ($SiO_2$) type, in particular precipitated or fumed silicas having a BET surface area of less than 450 $m^2/g$, preferably from 30 to 400 $m^2/g$.

A person skilled in the art will know, in the light of the present description, how to adjust the formulation of the filling rubber so as to achieve the desired levels of properties (especially elastic modulus) and how to adapt the formulation to the specific intended application.

According to a first embodiment of the invention, the formulation of the filling rubber may be chosen to be identical to the formulation of the rubber matrix that the cord of the invention is intended to reinforce. Thus, there is no compatibility problem between the respective materials, namely the filling rubber and said rubber matrix.

According to a second embodiment of the invention, the formulation of the filling rubber may be chosen to be different from the formulation of the rubber matrix that the cord of the invention is intended to reinforce. In particular, the formulation of the filling rubber may be adjusted using a relatively high amount of adhesion promoter, typically for example 5 to 15 phr of a metal salt, such as a cobalt salt, a nickel salt or a neodymium salt, and by advantageously reducing the amount of said promoter (or even completely eliminating it) in the surrounding rubber matrix.

Preferably, the filling rubber has, in the crosslinked state, a tensile secant modulus E10 (at 10% elongation) which is between 5 and 25 MPa, more preferably between 5 and 20 MPa, in particular in the range from 7 to 15 MPa.

A person skilled in the art will understand that the strands used in the multistrand cord of the invention described above could optionally be rubberized in situ with a filling rubber based on elastomers other than dienes, especially thermoplastic elastomers (TPEs) such as for example polyurethane (TPU) elastomers, which do not require, as is known, to be crosslinked or vulcanized but which have, at the service temperature, properties similar to those of a vulcanized diene elastomer.

However, and particularly preferably, the present invention is carried out with a filling rubber based on diene elastomers as described above, in particular using a specific manufacturing process which is particularly suitable for such elastomers, this manufacturing process being described in detail below.

II-2. Manufacture of the Multistrand Cord of the Invention

A) Manufacture of the Elementary Strands

The elementary strands of (L+M) construction described above, rubberized in situ preferably with a diene elastomer, can be manufactured using a specific process comprising the following steps, preferably carried out in line and continuously:

firstly, when L is different from 1, an assembly step, in which the L core wires are twisted together, to form the inner layer (Ci) at an assembly point;
then, upstream of said point where the L core wires are assembled (when L is different from 1), a sheathing step in which the inner layer (Ci) is sheathed with the uncured (i.e. uncrosslinked) filling rubber;
followed by an assembly step in which the M wires of the outer layer (Ce) are twisted around the inner layer (Ci) thus sheathed; and
then a final twist-balancing step.

It will be recalled here that there are two possible techniques for assembling metal wires:

either by cabling: in such a case, the wires undergo no twisting about their own axis, because of a synchronous rotation before and after the assembly point;
or by twisting: in such a case, the wires undergo both a collective twist and an individual twist about their own axis, thereby generating an untwisting torque on each of the wires and on the cord itself.

One essential feature of the above process is the use, both for assembling the inner layer Ci (when L is different from 1) and assembling the outer layer Ce, of a twisting step.

In the case in which L is equal to 1, it is the single core wire that undergoes the step of being sheathed with the filling rubber in the uncured state, before the M wires of the outer layer (Ce) are assembled by being twisted around the core wire thus sheathed.

During the first step, the L core wires are therefore twisted together (S or Z direction) in order to form the inner layer Ci, in a manner known per se; the wires are delivered by supply means, such as spools, a distributing grid, whether or not coupled to an assembling guide, intended to make the core wires converge on a common twisting point (or assembly point).

The inner layer (Ci) thus formed is then sheathed with uncured filling rubber, supplied by an extrusion screw at a suitable temperature. The filling rubber may thus be delivered to a single fixed point, of small volume, by means of a single extrusion head without having to individually sheath the wires upstream of the assembly operations, before formation of the inner layer as described in the prior art.

This process has the considerable advantage of not slowing down the conventional assembly process. It thus makes it possible for the complete operation—initial twisting, rubberizing and final twisting—to be carried out in line and in a single step whatever the type of strand produced (compact strand or cylindrically layered strand), all at high speed. The above process may be carried out at a speed (run speed of the strand on the twisting-rubberizing line) of greater than 70 m/min, preferably greater than 100 m/min.

Upstream of the extrusion head, the tension exerted on the L wire or wires, substantially identical from one wire to the other, is preferably between 10 and 25% of the breakage strength of the wires.

The extrusion head may comprise one or more dies, for example an upstream guiding die and a downstream sizing die. It is possible to add means for measuring and controlling the diameter of the strand continuously, these means being connected to the extruder. Preferably, the temperature at which the filling rubber is extruded is between 60° C. and 120° C., more preferably between 70° C. and 110° C. The extrusion head thus defines a sheathing zone having the form of a cylinder of revolution, the diameter of which is for example between 0.4 mm and 1.2 mm, and the length of which is for example between 4 and 10 mm.

The amount of filling rubber delivered by the extrusion head may be easily adjusted in such a way that, in the final L+M strand, this amount is between 5 and 40 mg, preferably between 5 and 35 mg and especially in the range from 10 to 30 mg per g of strand.

Preferably, at the outlet of the extrusion head, the inner layer Ci, at any point on its periphery, is covered with a minimum thickness of filling rubber which is preferably greater than 5 µm, more preferably greater than 10 µm, for example between 10 and 50 µm.

On leaving the above sheathing step, the final assembly is carried out, during a new step, again by twisting (S or Z direction) the M wires of the outer layer (Ce) around the inner layer (Ci) thus sheathed. During the twisting operation, the M wires bear on the filling rubber, becoming encrusted therein. The filling rubber, moving under the pressure exerted by these outer wires, then naturally has the tendency to fill, at least partly, each of the interstices or cavities left empty by the wires, between the inner layer (Ci) and the outer layer (Ce).

At this stage, the L+M strand is however not yet finished: in particular its central channel, delimited by the 3 or 4 core wires when L is different from 1 or 2, is not yet filled with filling rubber, or in any case is not filled sufficiently to obtain an acceptable air impermeability.

The important step that follows consists in making the strand, thus provided with its filling rubber in the uncured state, pass through twist-balancing means in order to obtain what is called a "twist-balanced" cord (i.e. one with practically no residual twist). The term "twist-balancing" is understood here to mean, as is well known by those skilled in the art, the cancelling-out of the residual torques (or untwisting spring-back) exerted on each wire of the strand both in the inner layer and in the outer layer.

Twist-balancing tools are known to those skilled in the art of twisting. They may for example consist of "straighteners" and/or "twisters" and/or "twister-straighteners" consisting either of pulleys in the case of twisters or small-diameter rollers in the case of straighteners, over which pulleys or rollers the strand passes, in a single plane or preferably in at least two different planes.

It is assumed a posteriori that, upon passing through this balancing tool, the detwisting force acting on the L core wires, causing an at least partial reverse rotation of these wires about their axis, is sufficient to force the filling rubber in the green state (i.e. the uncrosslinked or uncured state) while still hot and relatively fluid so as to drive it from the outside towards the centre of the strand, right into the central channel formed by the L wires, finally offering the constituent strands of the multistrand cord of the invention the excellent air impermeability property that characterizes them. The straightening function, provided by the use of a straightening tool also has the advantage that the contact between the rollers of the straightener and the wires of the outer layer exert addition pressure on the filling rubber, further promoting penetration thereof into the central capillary formed by the L core wires.

In other words, the process described above exploits the rotation of the L core wires, in the final stage of strand manufacture, in order for the filling rubber to be naturally distributed, homogeneously, into and around the inner layer (Ci), while perfectly controlling the amount of filling rubber supplied. A person skilled in the art will in particular know how to adjust the arrangement and the diameter of the pulleys and/or rollers of the twist-balancing means in order to vary the intensity of the radial pressure exerted on the various wires.

Thus, unexpectedly, it proves to be possible to make the filling rubber penetrate to the very core of each elementary strand of the multistrand cord of the invention by depositing the rubber compound downstream of the point of assembly of the L wires and not upstream, as described in the prior art, while controlling and optimizing the amount of filling rubber delivered by the use of a single extrusion head.

After this final twist-balancing step, the manufacture of the elementary strand, rubberized in situ by its filling rubber in the uncured state, is completed. The elementary strands thus prepared are wound onto one or more take-up reels, for storage, before the subsequent assembly operation by twisting the K elementary strands so as finally to obtain the multistrand cord of the invention.

Of course, this manufacturing process applies to the manufacture of compact-type elementary strands (as a reminder, and by definition, those of which the layers Ci and Ce are wound with the same pitch and in the same direction, when L is different from 1) as well as to strands of the cylindrically layered type (as a reminder, and by definition, those of which the layers Ci and Ce are wound either with different pitches, or in opposite directions, or else with different pitches and in opposite directions, when L is different from 1).

The process described above makes it possible, according to one particularly preferred embodiment, to manufacture elementary strands and therefore a multistrand cord with no (or virtually no) filling rubber on their periphery. By this expression it is meant that no particle of filling rubber is visible, to the naked eye, on the periphery of each elementary strand, or on the periphery of the multistrand cord of the invention. That is to say that a person skilled in the art would not know the difference, after manufacture, with the naked eye and at a distance of three meters or more, between a reel of multistrand cord according to the invention and a reel of conventional multistrand cord, i.e. one not rubberized in situ.

An assembling and rubberizing device that can be used to implement the process described above is a device comprising, from the upstream end to the downstream end, in the direction of advance of an elementary strand under manufacture:

means for feeding the L core wire(s);
means for assembling the L core wires, when L is different from 1, by twisting them in order to form the inner layer (Ci);
means for sheathing the inner layer (Ci);
at the outlet of the sheathing means, means for assembling the M outer wires by twisting them around the inner layer thus sheathed, in order to form the outer layer (Ce); and
finally, twist-balancing means.

The appended FIG. 7 shows an example of a twisting assembly device (100), of the rotating feed/rotating receiver type, which can be used for the manufacture of an elementary strand of the cylindrically layered type (different pitches $p_1$ and $p_2$ and/or different twist directions of the layers Ci and Ce), for example of (3+9) construction as illustrated in FIG. 1. In this device (100), feed means (110) deliver L (for example three) core wires (11) through a distributing grid (111) (axisymmetric distributor), which may or may not be coupled to an assembling guide (112), beyond which the L wires (11) converge on an assembly point or twisting point (113), in order to form the inner layer (Ci).

Once formed, the inner layer Ci then passes through a sheathing zone consisting, for example, of a single extrusion head (114) through which the inner layer is intended to pass. The distance between the point of convergence (113) and the sheathing point (114) is for example between 50 cm and 1 m. The M wires (12) of the outer layer (Ce), for example nine wires, delivered by feed means (120), are then assembled by being twisted around the inner layer Ci thus rubberized, progressing in the direction indicated by the arrow. The Ci+Ce strand thus formed is finally collected on a rotating receiver (140) after having passed through the twist-balancing means (130) consisting for example of a straightener or a twister-straightener.

It will be recalled here that, as is well known to those skilled in the art, to manufacture a (3+9) strand of compact type (identical pitches $p_1$ and $p_2$ and identical twisting directions of the layers C1 and C2) as shown for example in FIG. 3, a device (100) will be used which this time has a single rotating member (feeder or receiver), and not two as shown schematically by way of example in FIG. 7.

B) Manufacture of the Multistrand Cord

The process for manufacturing the multistrand cord of the invention is carried out, in a manner well known to those skilled in the art, by twisting the previously obtained elementary strands using twisting machines designed for assembling the strands.

According to a preferred embodiment, the twisting process used comprises the following known steps (see for example the aforementioned Patent Application WO 2004/003287) for obtaining a preferential multistrand cord of HE (high elongation) type:

the K elementary strands are wound together in a helix as a single layer, with a given transitory twisting pitch;
an overtwisting operation is carried out, intended to reduce this transitory pitch, that is to say intended to increase the helix angle of said layer and consequently the helix curvature of the latter; and
the cable obtained is stabilized by a detwisting operation, so as to obtain a zero residual torque.

II-3. Use of the Multistrand Cord as Crown Reinforcement for a Tire

The multistrand cord of the invention may be used for reinforcing articles other than tires, for example hoses, belts, conveyor belts; advantageously, it could also be used for reinforcing parts of tires other than their crown reinforcement, especially for the carcass reinforcement of tires for industrial vehicles.

However, as explained in the introduction of the present document, the cord of the invention is particularly intended as a tire crown reinforcement for heavy industrial vehicles.

To give an example, FIG. 8 shows very schematically a radial cross section through a tire with a metal crown reinforcement, which may or may not be in accordance with the invention, in this general representation.

This tire 1 comprises a crown 2 reinforced by a crown reinforcement or belt 6, two sidewalls 3 and two beads 4, each of these beads 4 being reinforced by a bead wire 5. The crown 2 is covered with a tread (not shown in this schematic figure). A carcass reinforcement 7 is wound around the two bead wires 5 in each bead 4, the turn-up 8 of this reinforcement 7 lying for example to the outside of the tire 1, which is shown here mounted on its rim 9. As is known per se, the carcass reinforcement 7 is formed by at least one ply reinforced by "radial" cords, that is to say these cords are practically parallel to one another and extend from one bead to the other so as to make an angle of between 80° and 90° with the median circumferential plane (the plane perpendicular to the rotation axis of the tire, which plane is located half-way between the two beads 4 and passes through the middle of the crown reinforcement 6).

The tire according to the invention is characterized in that its belt 6 comprises at least, as reinforcement for at least one of the belt plies, a multistrand cord according to the invention. In this belt 6 shown schematically in a very simple manner in FIG. 7, it will be understood that the multistrand cords of the invention may for example reinforce some or all of the protective, hoop or working plies. Of course, this tire 1 also includes, as is known, an inner layer of rubber compound or elastomer (usually called "inner liner") that defines the radially inner face of the tire and is intended to protect the carcass ply from the diffusion of air coming from the space inside the tire.

III. EMBODIMENTS OF THE INVENTION

The following tests demonstrate the capability of the invention to provide multistrand cords of appreciably increased endurance, in particular when used as a tire belt, because of the excellent air impermeability property of the constituent strands of these cords.

III-1. Nature and Properties of the Wires and Strands Used

In the following tests, two-layer strands of 3+9 construction as shown schematically in FIG. 1, formed of fine brass-coated carbon steel wires, were used as elementary strands.

The carbon steel wires were prepared in a known manner, for example from wire stock (5 to 6 mm in diameter) which was firstly work-hardened, by rolling and/or drawing, down to an intermediate diameter close to 1 mm. The steel used for the cord C-1 according to the invention was an HT (high tensile) carbon steel, the carbon content of which being about 0.8%.

The wires of intermediate diameter underwent a degreasing and/or pickling treatment before their subsequent conversion. After a brass coating had been deposited on these intermediate wires, what is called a "final" work-hardening operation was carried out on each wire (i.e. after the final patenting heat treatment), by cold-drawing it in a wet medium with a drawing lubricant for example in the form of an aqueous emulsion or dispersion.

The steel wires thus drawn have the following diameter and mechanical properties:

TABLE 1

| Steel | φ (mm) | $F_m$ (N) | $R_m$ (MPa) |
|---|---|---|---|
| HT | 0.23 | 128 | 3190 |

These wires were then assembled in the form of two-layer strands of (3+9) construction (referenced 10 in FIG. 1), the mechanical properties of which, measured on strands extracted from a multistrand cord according to the invention (of 3×(3+9) construction with a pitch $P_K$ equal to 10 mm, as shown schematically in FIG. 2), are given in Table 2:

TABLE 2

| Strand | $p_1$ (mm) | $p_2$ (mm) | $F_m$ (daN) | $R_m$ (MPa) |
|---|---|---|---|---|
| 3 + 9 | 4 | 6 | 130 | 2710 |

This strand (10) of (3+9) construction, as shown schematically in FIG. 1, is formed of 12 wires in total, all with a diameter of 0.23 mm, which were wound with different pitches and in the same twist direction (S/S) in order to obtain a strand (C-1) of the cylindrically layered type. The amount of filling rubber, measured according to the method indicated above in section I-3, was 16 mg per g of strand.

To manufacture this strand, a device such as that described above and shown schematically in FIG. 7 was used. The filling rubber was a conventional rubber composition for a tire crown reinforcement. This composition was extruded at a temperature of 90° C. through a 0.530 mm sizing die.

III-2. Air Permeability Tests

The strands of (3+9) construction manufactured above were also subjected to the air permeability test described in section I-2, carried out on strand lengths of 3 cm (i.e. equal to 3 times $P_K$), measuring the volume of air (in $cm^3$) passing through the strands in 1 minute (an average of 10 measurements for each strand tested).

For each strand (10) tested and for 100% of the measurements (i.e. ten specimens in ten), a rate of zero or less than 0.2 $cm^3$/min was measured. In other words, the strands of the multistrand cords of the invention may be termed airtight along their axis and they are therefore optimally penetrated by the rubber.

Moreover, control in situ rubberized strands, of the same construction as the above strands (10), were prepared by individually sheathing either a single wire or each of the three wires of the inner layer Ci. This sheathing was carried out using extrusion dies of variable diameter (280 to 350 µm) placed this time upstream of the point of assembly (in-line sheathing and twisting) as described in the prior art (see the aforementioned US application 2002/160213). For strict comparison, the amount of filling rubber was also adjusted in such a way that the amount thereof (between 4 and 30 mg/g of strand, measured using the method of section I-3) in the final strands was close to that of the strands of the multistrand cord of the invention.

In the case of sheathing of a single wire, whatever the strand tested, it was found that 100% of the measurements (i.e. 10 specimens in 10) showed an air flow rate greater than 2 $cm^3$/min. The measured average flow rate varied from 4 to 15 cm³/min depending on the operating conditions used, especially the diameter of the extrusion die tested. In other words, each of the above control strands tested could not be termed airtight along its longitudinal axis within the meaning of the test in section I-2.

In the case of the individual sheathing of each of the three wires, although the measured average flow rate proved in many cases to be less than 2 cm³/min, it was observed that the strands obtained had a relatively large amount of filling rubber at their periphery, making them unsuitable for being calendered under industrial conditions.

In conclusion, thanks to the specific construction of its constituent outer strands and the excellent air impermeability that characterizes them, the multistrand cord of the invention is capable of having improved fatigue and fatigue-corrosion resistance, while meeting the usual cabling and rubberizing requirements under industrial conditions.

The invention claimed is:

1. A multistrand metal cord of K×(L+M) construction, which can notably be used for reinforcing tire belts for industrial vehicles, consisting of K elementary strands assembled in a helix, with a helix pitch $P_K$, each elementary strand:
   comprising a cord having two layers of L+M construction, rubberized in situ, comprising an inner layer comprised of L wires of diameter $d_1$, L varying from 1 to 4, and an outer layer of M wires, M being equal to or greater than 5, of diameter $d_2$, which are assembled in a helix with a pitch $p_2$ around the inner layer; and
   having the following characteristics ($d_1$, $d_2$ and $p_2$ being expressed in mm):
   $0.10<d_1<0.50$;
   $0.10<d_2<0.50$;
   $3<p_2<10$;
   wherein said inner layer of the elementary strand is sheathed with a rubber composition called a "filling rubber";
   over any length of the elementary strand equal to K times $P_K$, the filling rubber is present in each of the capillaries delimited by the L wires of the inner layer and the M wires of the outer layer, and also, when L is equal to 3 or 4, in the central channel delimited by the L wires of the inner layer; and
   the amount of filling rubber in said elementary strand is between 5 and 40 mg per g of elementary strand.

2. The multistrand cord according to claim 1, wherein, in each elementary strand, the following characteristics are satisfied:
   $0.15<d_1<0.35$;
   $0.15<d_2<0.35$.

3. The multistrand cord according to claim 1, wherein, in each elementary strand, $p_2$ is in the range from 4 to 8 mm.

4. The multistrand cord according to claim 1, wherein $P_K$ is between 3 and 15 mm.

5. The multistrand cord according to claim 1, wherein, in each elementary strand, L is equal to 1 and M is equal to 5, 6 or 7.

6. The multistrand cord according to claim 1, wherein, in each elementary strand, L is different from 1 and the L wires of diameter $d_1$ are helically wound with a pitch $p_1$ satisfying the relationship:
   $0.5<p_1/p_2\le1$.

7. The multistrand cord according to claim 6, wherein, in each elementary strand, $p_1$ is between 3 and 10 mm.

8. The multistrand cord according to claim 6, wherein, in each elementary strand, $p_1$ is equal to $p_2$.

9. The multistrand cord according to claim 6, wherein, in each elementary strand, L is equal to 2 and M is equal to 7, 8 or 9.

10. The multistrand cord according to claim 6, wherein, in each elementary strand, L is equal to 3 and M is equal to 8, 9 or 10.

11. The multistrand cord according to claim 6, wherein, in each elementary strand, L is equal to 4 and M is equal to 8, 9, 10 or 11.

12. The multistrand cord according to claim 1, wherein, in each elementary strand, the following relationship applies:
   $0.7\le d_1/d_2\le1.3$.

13. The multi-strand cord according to claim 6, wherein, in each elementary strand, the L wires of the inner layer are helically wound with the same pitch and in the same twist direction as the M wires of the outer layer.

14. The multistrand cord according to claim 6, wherein, in each elementary strand, the wires of the inner layer are helically wound either with a different pitch, or in a different twist direction, or with both a different pitch and a different twist direction, compared to the wires of the outer layer.

15. The multistrand cord according to claim 1, wherein, in each outer strand, the elementary layer is a saturated layer.

16. The multistrand cord according to claim 1, wherein the K elementary strands are wound in a helix in the same twist direction as the M wires of the outer layer of each elementary strand.

17. The multistrand cord according to claim 1, wherein, in each elementary strand, the rubber of the filling rubber is a diene rubber.

18. The multistrand cord according to claim 17, wherein, in each elementary strand, the diene elastomer of the filling rubber is chosen from the group formed by polybutadienes, natural rubber, synthetic polyisoprenes, butadiene copolymers, isoprene copolymers and the blends of these elastomers.

19. The multistrand cord according to claim 18, wherein, in each elementary strand, the diene elastomer is natural rubber.

20. The multistrand cord according to claim 1, wherein, in each elementary strand, the amount of filling rubber is between 5 and 35 mg per g of elementary strand.

21. The multistrand cord according to claim 1, wherein, in an air permeability test, each elementary strand has an average air flow rate of less than 2 cm³/min.

22. The multistrand cord according to claim 1, wherein K is equal to 3, 4 or 5.

23. The multistrand cord according to claim 22, wherein K is equal to 3.

24. The multistrand cord according to claim 23, of 3×(1+M) construction, wherein M is equal to 6 or 7.

25. The multistrand cord according to claim 23, of 3×(2+M) construction, wherein M is equal to 7, 8 or 9.

26. The multistrand cord according to claim 23, of 3×(3+M) construction, wherein M is equal to 8, 9 or 10.

27. The multistrand cord according to claim 23, of 3×(4+M) construction, wherein M is equal to 8, 9, 10 or 11.

28. A tire comprising a cord according to claim 1.

29. The tire according to claim 28, said multistrand cord being present in the belt of the tire.

30. The multistrand according to claim 1, wherein $P_K$ is in the range from 4 to 12 mm.

31. The multistrand cord according to claim 21, wherein, in the air permeability test, each elementary strand has an average air flow rate less than or at most equal to 0.2 cm³/min.

* * * * *